United States Patent
Jordan et al.

(10) Patent No.: US 9,700,967 B2
(45) Date of Patent: Jul. 11, 2017

(54) HEAT EXCHANGER AND METHOD OF REPAIRING THEREOF

(71) Applicant: HONEYWELL INTERNATIONAL INC., Morristown, NJ (US)

(72) Inventors: John D Jordan, Owasso, OK (US); John Richard Ragsdale, Owasso, OK (US); Brandy Bradley, Tulsa, OK (US); Justin Alan Loyd, Owasso, OK (US); Ken Brackett, Owasso, OK (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 194 days.

(21) Appl. No.: 14/209,892

(22) Filed: Mar. 13, 2014

(65) Prior Publication Data

US 2015/0258644 A1    Sep. 17, 2015

(51) Int. Cl.
*B23P 15/26* (2006.01)
*B23P 6/00* (2006.01)
(Continued)

(52) U.S. Cl.
CPC ............... *B23P 15/26* (2013.01); *B23P 6/00* (2013.01); *F28D 7/1669* (2013.01); *F28F 9/162* (2013.01);
(Continued)

(58) Field of Classification Search
CPC ..... B23P 15/26; B23P 6/00; F28F 1/00; F28F 19/02; F28F 19/04; F28F 9/162;
(Continued)

(56) References Cited

U.S. PATENT DOCUMENTS

| | | | | |
|---|---|---|---|---|
| 4,168,743 A | * | 9/1979 | Arai ................. | F28F 21/02 165/133 |
| 4,454,173 A | * | 6/1984 | Koga ................. | F16L 55/164 427/181 |

(Continued)

FOREIGN PATENT DOCUMENTS

CA    2707023 C    5/2013

OTHER PUBLICATIONS

Curran, E.L., Solving Heat Exchanger Tube Problems with Thin Film Thermally Conductive Coating Applications and Novel Tube and Pipe Cleaning as a Precursor to Coating Application and NDT, Proceedings of International Conference on Heat Exchanger Fouling and Cleaning VIII—2009, Jun. 14-19, 2009, Schladming, Austria.

*Primary Examiner* — David Bryant
*Assistant Examiner* — Lawrence Averick
(74) *Attorney, Agent, or Firm* — Shimokaji IP (57) ABSTRACT

A heat exchanger includes a fluid circuit including a fluid inlet manifold, a fluid outlet manifold, and fluid heat exchange channels fluidly connected between the fluid inlet manifold and the fluid outlet manifold. Each channel has an interior, and walls with an inside surface. A method of repairing the heat exchanger includes pumping an epoxy varnish into the interior of at least one of the heat exchange channels; filling in at least one of a) one or more cracks in the walls of the at least one channel, b) one or more apertures in the walls of the at least one channel, or c) one or more spaces between the at least one channel and another component of the heat exchanger with the epoxy varnish; and heating the at least one channel to a temperature in an approved predetermined epoxy varnish temperature range.

4 Claims, 6 Drawing Sheets

(51) Int. Cl.
*F28F 9/16* (2006.01)
*F28D 7/16* (2006.01)
*F28F 9/18* (2006.01)
*F28F 11/00* (2006.01)
*F28F 1/00* (2006.01)
*F28D 21/00* (2006.01)

(52) U.S. Cl.
CPC ............... *F28F 9/18* (2013.01); *F28F 11/00* (2013.01); *F28D 2021/0021* (2013.01); *F28F 2275/025* (2013.01); *Y10T 29/49352* (2015.01)

(58) Field of Classification Search
CPC . F28F 9/18; F28F 2275/025; Y10T 29/49352; F28D 7/1669; F28D 2021/002
USPC .................... 165/76, 133, 134.1; 29/890.031
See application file for complete search history.

(56) References Cited

U.S. PATENT DOCUMENTS

| | | | |
|---|---|---|---|
| 4,503,907 A * | 3/1985 | Tanaka | B05D 7/14 165/133 |
| 5,622,209 A | 4/1997 | Naf | |
| 6,173,493 B1 * | 1/2001 | Dierbeck | B23P 15/26 165/148 |
| 6,301,780 B1 * | 10/2001 | Templeton | B23P 6/00 29/402.13 |
| 6,604,572 B2 * | 8/2003 | Kawamoto | C23C 30/00 165/133 |
| 6,620,274 B1 * | 9/2003 | Nagaya | B23P 6/00 156/196 |
| 6,739,950 B1 * | 5/2004 | Kruse | B05D 7/222 451/28 |
| 7,041,176 B2 * | 5/2006 | Kruse | B05D 7/222 134/21 |
| 7,160,574 B1 * | 1/2007 | Gillanders | B05D 3/12 427/238 |
| 7,500,494 B2 * | 3/2009 | Robinson | B29C 70/32 138/172 |
| 2002/0050343 A1 * | 5/2002 | Kawamoto | C23C 30/00 165/133 |
| 2004/0129373 A1 * | 7/2004 | Nadarajah | F16L 55/168 156/94 |
| 2004/0132387 A1 * | 7/2004 | Kruse | B05D 7/222 451/51 |
| 2010/0031817 A1 * | 2/2010 | Ehrenberg | F24F 5/0035 95/52 |
| 2012/0183755 A1 * | 7/2012 | Jaworowski | B05D 3/0254 428/213 |
| 2013/0074970 A1 * | 3/2013 | Gillanders | B05D 3/12 138/97 |
| 2013/0261229 A1 * | 10/2013 | Sano | C08L 63/00 523/435 |
| 2013/0283585 A1 * | 10/2013 | Desireddy | B23P 6/00 29/402.03 |
| 2015/0198389 A1 * | 7/2015 | Jaworowski | B05D 3/0254 165/133 |
| 2015/0338296 A1 * | 11/2015 | Georgeson | B64F 5/40 116/212 |

\* cited by examiner

HEAT EXCHANGER AND METHOD OF REPAIRING THEREOF

BACKGROUND OF THE INVENTION

The present disclosure relates generally to heat exchangers. Specifically the disclosure relates to a method of repairing a fluid circuit in a heat exchanger.

Fluid circuits in heat exchangers may experience extreme variances in thermal cycles leading to thermal stresses on components. For example, when installed in an aircraft air conditioning system, to cool air from the engine compressor for circulation in the aircraft cabin, with air drawn in from the atmosphere, the temperature of the atmospheric air, and the temperature of the engine compressor air may vary widely. These varying temperatures may cause expansions and contractions of elements of the heat exchanger, and the rates of these expansions and contractions may vary between components of the heat exchanger. The resultant thermal stresses may cause cracks, apertures, or other damage or wear to the heat exchanger and in particular to channels or tubes in the heat exchanger. The atmospheric air drawn into the engine and the heat exchanger may contain particulates and corrosive materials such as sulfuric and nitric acids. Exposure to and/or contact with these substances may also cause cracks, apertures, or other damage or wear to the heat exchanger.

As a result of damage and wear, fluid circuits in the heat exchanger may leak fluid above an acceptable level. To remedy this, the heat exchanger or components of the heat exchanger, such as a fluid circuit, may be removed from the aircraft or other application, repaired, and reinstalled. Some traditional repair methods of heat exchanger fluid circuits, including fluid channels such as tubes, include sealing the leaking channels or tubes by plugging them with mechanical seals or through a welding process. If too many channels or tubes are plugged in this manner, the heat exchanger may not function acceptably and may need to be replaced. Additionally, repairing a heat exchanger by plugging leaking channels or tubes may require disassembling the heat exchanger which may require a longer time period than desired.

As can be seen, there may be a need for a heat exchanger repair method which minimizes the repair period and increases the useful life of the heat exchanger.

SUMMARY OF THE INVENTION

In one aspect of the present invention, a method of repairing a heat exchanger having a fluid circuit, the fluid circuit including a fluid inlet manifold, a fluid outlet manifold, and fluid channels fluidly connected between the fluid inlet manifold and the fluid outlet manifold; each fluid channel including an interior, and walls with an inside surface comprises pumping an epoxy varnish into the interior of at least one of the fluid channels; filling in at least one of cracks and apertures in the walls of the at least one channel, and spaces between the at least one channel and another component of the heat exchanger with the epoxy varnish; and heating the at least one channel to a temperature in a predetermined epoxy varnish temperature range for a time period in a predetermined epoxy varnish time period range.

In another aspect of the present invention, a fluid circuit for a heat exchanger comprises a fluid inlet manifold; a fluid outlet manifold; at least one fluid channel fluidly connected between the fluid inlet manifold and the fluid outlet manifold, the at least one fluid channel including an interior and walls including an inside surface and an aperture or crack; and hardened epoxy varnish coating the inside surface of the walls and filling in the aperture or crack.

In another aspect of the present invention, a fluid circuit for a heat exchanger comprises a fluid inlet manifold; a fluid outlet manifold; at least one fluid channel fluidly connected between the fluid inlet manifold and the fluid outlet manifold at joints; at least one of the joints including a space between the at least one fluid channel and the fluid inlet manifold or the fluid outlet manifold; and hardened epoxy varnish sealing the space between the at least one fluid channel and the fluid inlet manifold or the fluid outlet manifold at the at least one of the joints.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

Figure 1:
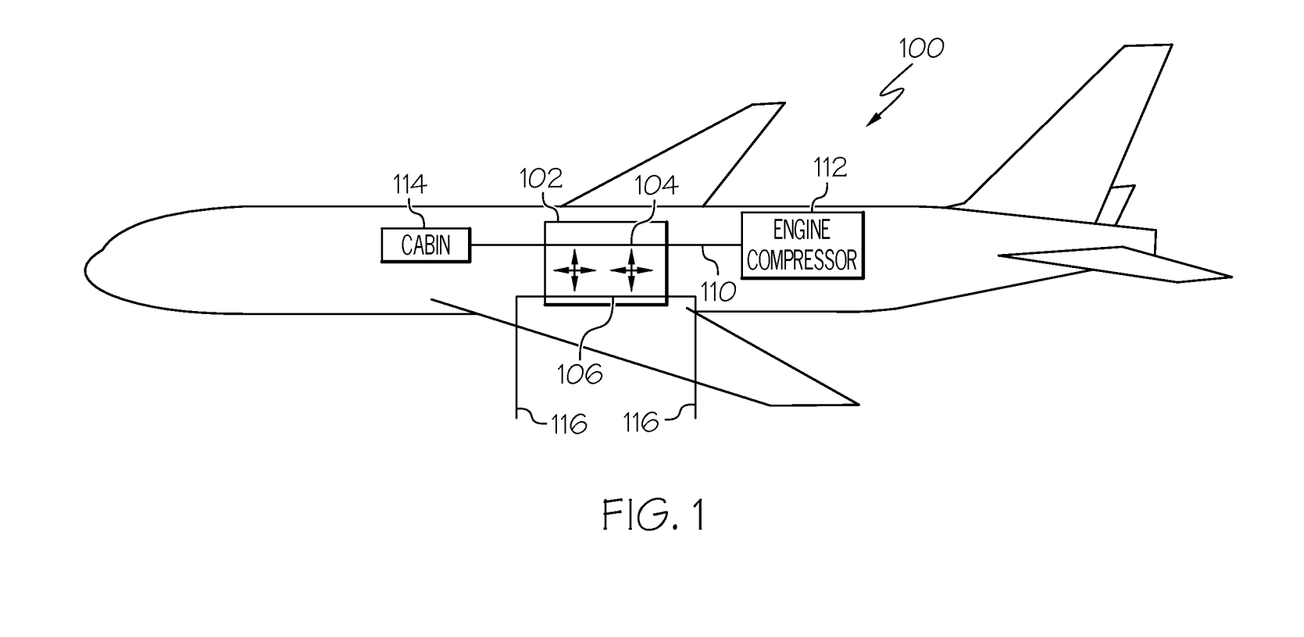
FIG. 1 is a schematic of a heat exchanger in an exemplary application of an aircraft.

Referring now to FIG. 1, a schematic of an exemplary embodiment of an aircraft 100 including, and illustrating an application of, a heat exchanger 102 is illustrated. In the application illustrated, the heat exchanger 102 may include a first fluid circuit 104 in thermal communication (as illustrated through arrows 108) with a second fluid circuit 106. The heat exchanger may be located in a wing compartment of the aircraft 100. A first fluid flowing through the first fluid circuit 104 may transfer thermal energy to a second fluid flowing through the second fluid circuit 106 as would be known by an ordinary person skilled in the art. Heat exchanger 102 may be included in an air conditioning system, and may include a condenser, which provides cooled air to the cabin 114 of aircraft 100. The first fluid may include compressed hot air from an engine compressor 112, such as, for example, a turbine engine compressor or a compressor of a turbocharger. The hot compressed air may flow through conduits 110 to the first fluid circuit 104, transfer thermal energy to the second fluid in the second fluid circuit 106 decreasing the temperature of the compressed air, and flow through conduits 110 to the cabin 114. The second fluid may include atmospheric air entering conduits 116 from outside aircraft 100. The atmospheric air may flow through conduits 116 to second fluid circuit 106, absorb heat from the compressed hot air in the first fluid circuit 104, and flow through conduits 116 back into the atmosphere.

In the application illustrated, the first fluid may enter the first fluid circuit 104 at a wide range of temperatures which may be a result of varying engine operating conditions and parameters, and varying temperatures of atmospheric air outside the aircraft 100. The temperature of the second fluid entering the second fluid circuit 106 may also vary widely which may be the result of the varying temperature of the atmospheric air outside aircraft 100. Varying temperatures in both the first and second fluid circuits 104, 106 may cause expansions and contractions of elements of the heat exchanger 102, and the rates of these expansions and contractions may vary between components. The resultant thermal stresses may cause cracks, apertures, or other damage and/or wear to the first fluid circuit 104. Substances in the atmospheric air such as particulates, and corrosive substances such as sulfuric and nitric acids may also enter the first fluid circuit 104 or the second fluid circuit 106. These pollutants may also cause cracks, apertures, or other damage or wear to first fluid circuit 104.

As a result of damage and/or wear, first fluid circuit 104 may have leaked the first fluid above an acceptable level. To remedy this, first fluid circuit 104 may have been removed from aircraft 100, repaired, and reinstalled into aircraft 100. Traditional repair methods of heat exchanger circuits with channels 122 or tubes 124 (shown in relation to FIG. 2) may involve sealing the leaking channels 122 or tubes 124 by plugging the tubes with mechanical seals or through a welding process. If too many channels 122 or tubes 124 are plugged in this manner, the first fluid circuit 104 may not function acceptably and may need to be replaced. Additionally, repairing first fluid circuit 104 by plugging leaking channels 122 or tubes 124 may require a longer time period than desired. First fluid circuit 104 may have been alternatively repaired using a method, an embodiment of which is described below in relation to FIGS. 7, 8, and 9.

Figure 2:
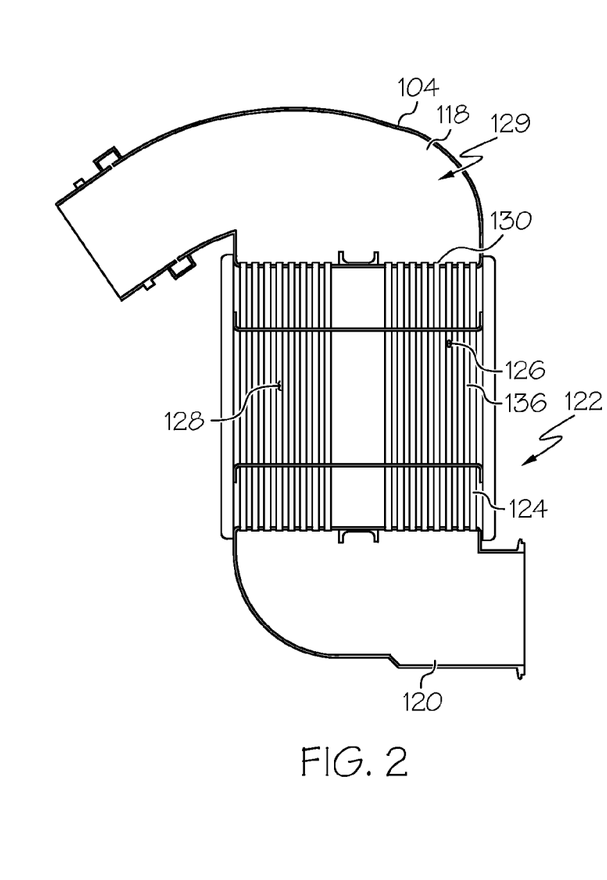
FIG. 2 is a schematic of and exemplary embodiment of a fluid circuit of a heat exchanger.

Referring now to FIG. 2, an exemplary embodiment of the first fluid circuit 104 is illustrated. First fluid circuit 104 may include a fluid inlet manifold 118, a fluid outlet manifold 120, and at least one fluid channel 122 fluidly connected between the fluid inlet manifold 118, and the fluid outlet manifold 120. The at least one fluid channel 122 may include an interior 134 (shown in relation to FIG. 3), and walls 136 (shown in relation to FIG. 3) having an inside surface 138 (shown in relation to FIG. 3). A hardened epoxy varnish 132 (shown in relation to FIG. 3) may coat the inside surface 138.

In the exemplary embodiment illustrated, the first fluid circuit 104 may include a plurality of channels 122. The channels 122 may include cylindrically shaped tubes 124. One or more of the channels 122 may include an aperture 126 and/or a crack 128 that may have developed as a result of damage or wear to the first fluid circuit 104. Left unrepaired the aperture 126 and/or crack 128 may have caused the first fluid circuit 104 to leak the first fluid at an unacceptable rate. According to an exemplary embodiment of the invention, after repair, the aperture 126 and/or the crack 128 may be filled in with hardened epoxy varnish 132 and may no longer leak the first fluid.

In the illustrated embodiment, at least one fluid channel 122 may be fluidly connected with the inlet manifold 118 and/or the outlet manifold at a joint 129. The joint 129 may be formed by brazing the at least one fluid channel 122 to a header plate 139 (shown in relation to FIG. 5) to form a brazed joint 130. Brazing channels 122 or tubes 124 to header plates to form brazed joints 130 is well known by those skilled in the art. In alternative embodiments, the end of a channel 122 may be fixedly attached to the inlet and/or outlet manifold 118, 120 through welding, adhesives or any other method that would be known by an ordinary person skilled in the art. Due to thermal stresses and/or corrosive substances in the atmosphere, as described above, one or more tubes 124 may have become detached from the header plate 139, leaving a space 140 (shown in relation to FIG. 6) between the tube 124 and the header plate 139. The first fluid may have leaked at an unacceptable level through the space 140. After repair, hardened epoxy varnish 132 seals the space 140.

In one embodiment, components of the first fluid circuit 104 may include aluminum or aluminum alloys. In other embodiments the first fluid circuit 104 may include other materials that would be known by ordinary persons skilled in the art. The materials included in the first fluid circuit 104 may be dictated by the application in which the first fluid circuit 104 operates and the environment of that application.

In one embodiment, the channels 122 may include tubes 124 with a length of about 9 inches, and a diameter between 0.208 and 0.268 inches. The tubes 124 may be brazed within a framework of header plates 139 to form a core matrix for the heat exchanger 102.

The hardened epoxy varnish 132 (shown in relation to FIG. 3) may include a heat cured water reducible epoxy-phenolic varnish, and may have been specifically developed for anti-corrosion and heat protection, and for use in the aeronautical sector. The hardened epoxy varnish 132 may be rated to withstand a salt fog for 500 hours, resist some fire resistant aviation hydraulic fluids for 24 hours, and resist engine oil for 24 hours. A thickness of a coating of hardened epoxy varnish 132 on the inside surface 138 of the channel walls 136 may be about 15 microns according to an exemplary embodiment. In other embodiments, the thickness may be between 5 microns and 25 microns. In other embodiments the hardened epoxy varnish 132 may include epoxy varnishes which are developed to meet specifications favorable to the particular application of the heat exchanger 102 (FIG. 1) as would be known by an ordinary person skilled in the art.

Figure 3:
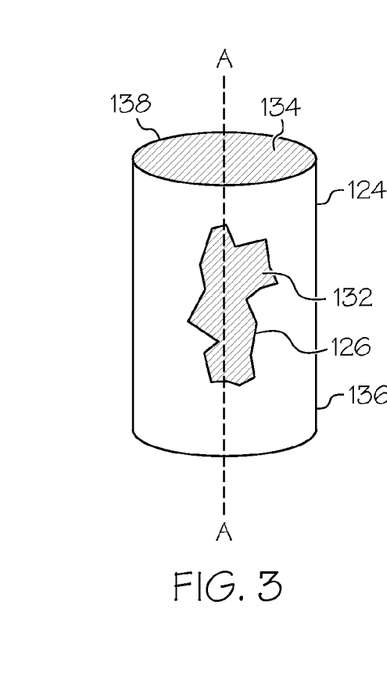
FIG. 3 is a perspective view of an exemplary portion of a fluid channel of the fluid circuit.

Referring now to FIG. 3, an exemplary portion of a tube 124 including an aperture 126 is illustrated. The aperture 126 may have developed in wall 136 as a result of being exposed to thermal stresses or corrosive fluids and materials as described above. After a repair process, hardened epoxy varnish 132 fills the aperture 126 and coats the inside surface 138

Figure 4:
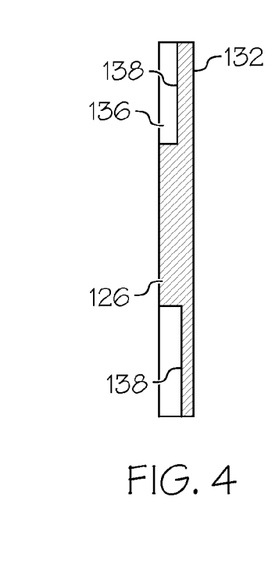
FIG. 4 is a cross section of a wall of a fluid channel along line A-A of FIG. 3.

Referring now to FIG. 4, a cross-section of the wall 136 along dotted line AA of FIG. 3 is illustrated. The cross section illustrated is along a section of the wall 136 including an aperture 126. Hardened epoxy varnish 132 coats the inside surface 138 of the wall 136 and fills in the aperture 126. Although not illustrated in the drawings, the wall 136 of one of the tubes 124 with the crack 128 may be similarly coated with hardened epoxy varnish 132, and the crack 128 may be filled in with hardened epoxy varnish 132 similar to the manner in which aperture 126 may be filled in with hardened epoxy varnish 132.

Figure 5:
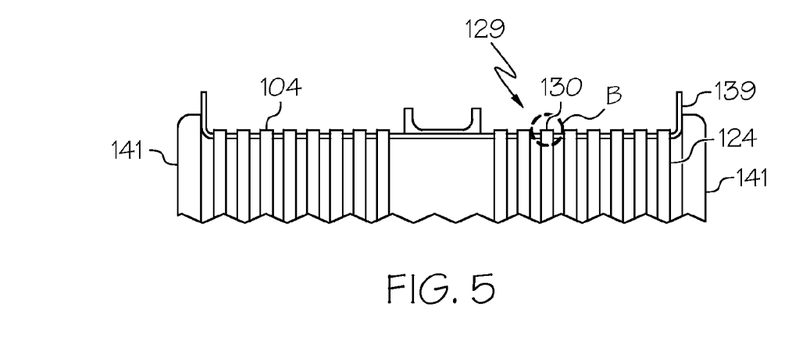
FIG. 5 is a blown up portion of the schematic of FIG. 2.

Referring to FIG. 5, a blown up portion of the schematic of FIG. 2 is illustrated. The first fluid circuit may include a header plate 139 fixedly attached to side walls 141. Tubes 124 may be fixedly attached to the header plate at joints 129. The joints 129 may be brazed joints. Although the header plate 139 and joints 129 are shown in relation to the inlet manifold 118, persons skilled in the art will understand that the tubes could also be fluidly connected in the same manner to the outlet manifold 120. Due to thermal or other stresses, one or more tubes 124 may have become partially detached from the header plate 139 in the encircled section marked "B", resulting in a space 40 through which fluid could leak. First fluid circuit 104 may have been repaired such that the inside surface 138 of wall 136 may be coated with a hardened epoxy varnish 132, and space 140 is sealed with hardened epoxy varnish 132.

Figure 6:
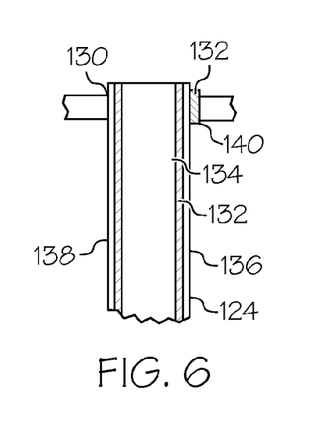
FIG. 6 is a cross section of a joint of a fluid channel and a header plate taken in Section B of FIG. 5.

Referring now to FIG. 6, a cross-section of the wall 136 and brazed joint 130 in the circled section "B" of FIG. 5 is illustrated. The cross section illustrated is along a section of the wall 136 and brazed joint 130 including space 140. Hardened epoxy varnish 132 coats the inside surface 138 of the wall 136 and seals the space 140.

Figure 7:
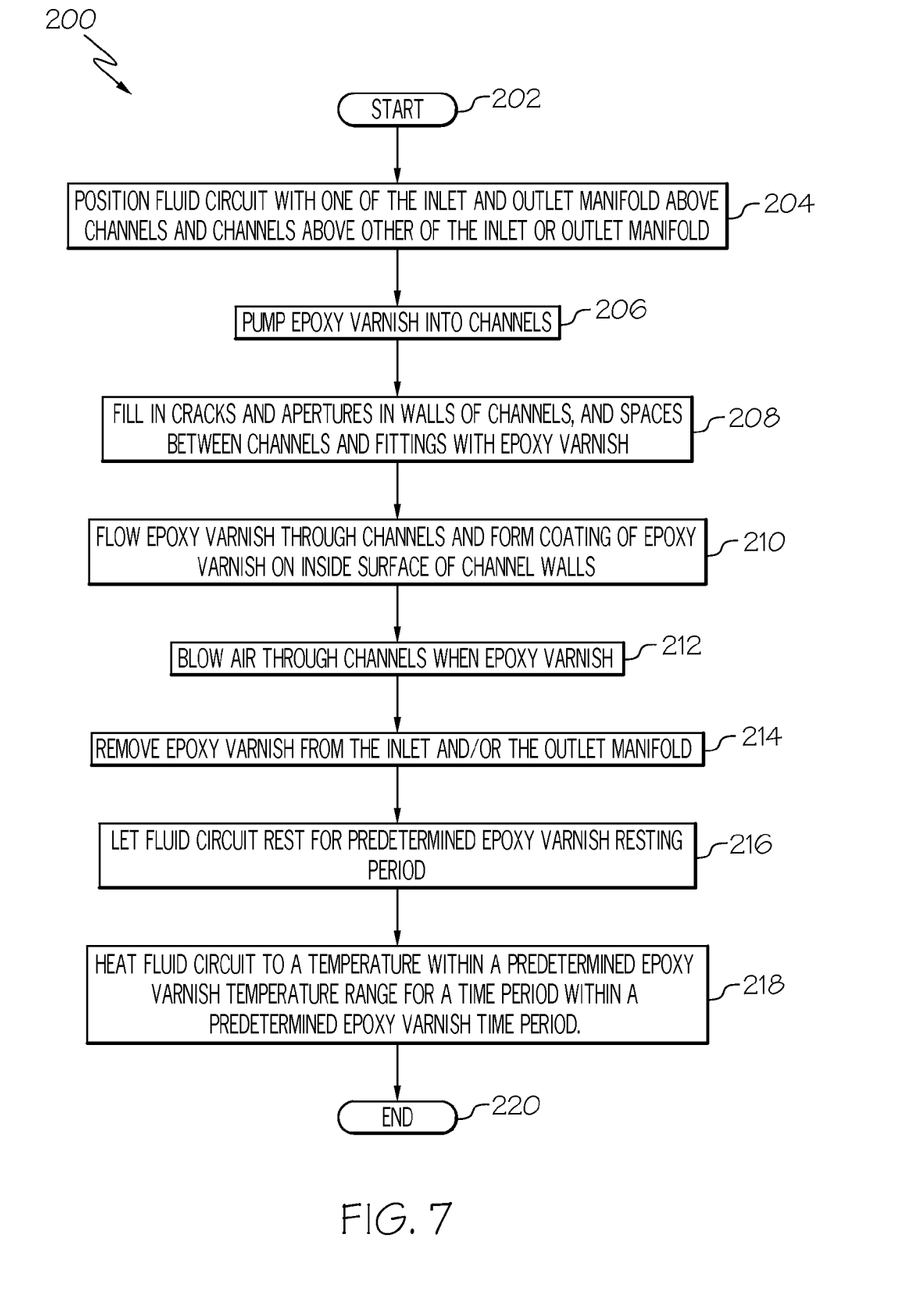
FIG. 7 is a flow chart of an exemplary method of repairing a heat exchanger.

Referring now to FIG. 7, a flow chart of an exemplary method 200 of repairing a heat exchanger 102 is illustrated. The heat exchanger 102 depicted in FIGS. 1-6, and described above, may have been repaired using an embodiment of method 200. The exemplary method 200 is further illustrated in relation to FIGS. 8 and 9. The heat exchanger 102 may include a first fluid circuit 104. The first fluid circuit 104 may include a fluid inlet manifold 118, a fluid outlet manifold 120, and fluid channels 122 fluidly connected between the fluid inlet manifold 118 and the fluid outlet manifold 120. Each fluid channel 122 including an interior 134, and walls 136 with an inside surface 138. The method 200 may include pumping an epoxy varnish 152 into the interior 134 of at least one of the fluid channels 122; filling in at least one of cracks 128 and apertures 126 in the walls 136 of the at least one channel 122, and spaces 140 between the at least one channel 122 and another component of the heat exchanger 102 at a joint 129 with the epoxy varnish 152; and heating the at least one channel 122 to a temperature in a predetermined epoxy varnish 152 temperature range for a time period in a pre-determined epoxy varnish 152 time period range.

When the first fluid circuit 104 of the heat exchanger 102 is found to be leaking unacceptable amounts of the first fluid, the first fluid circuit 104 may be removed from the operating application, such as aircraft 100 (FIG. 1), and sent to a facility to be repaired. Repair of the first fluid circuit may be accomplished through an exemplary embodiment of method 200.

Figure 8:
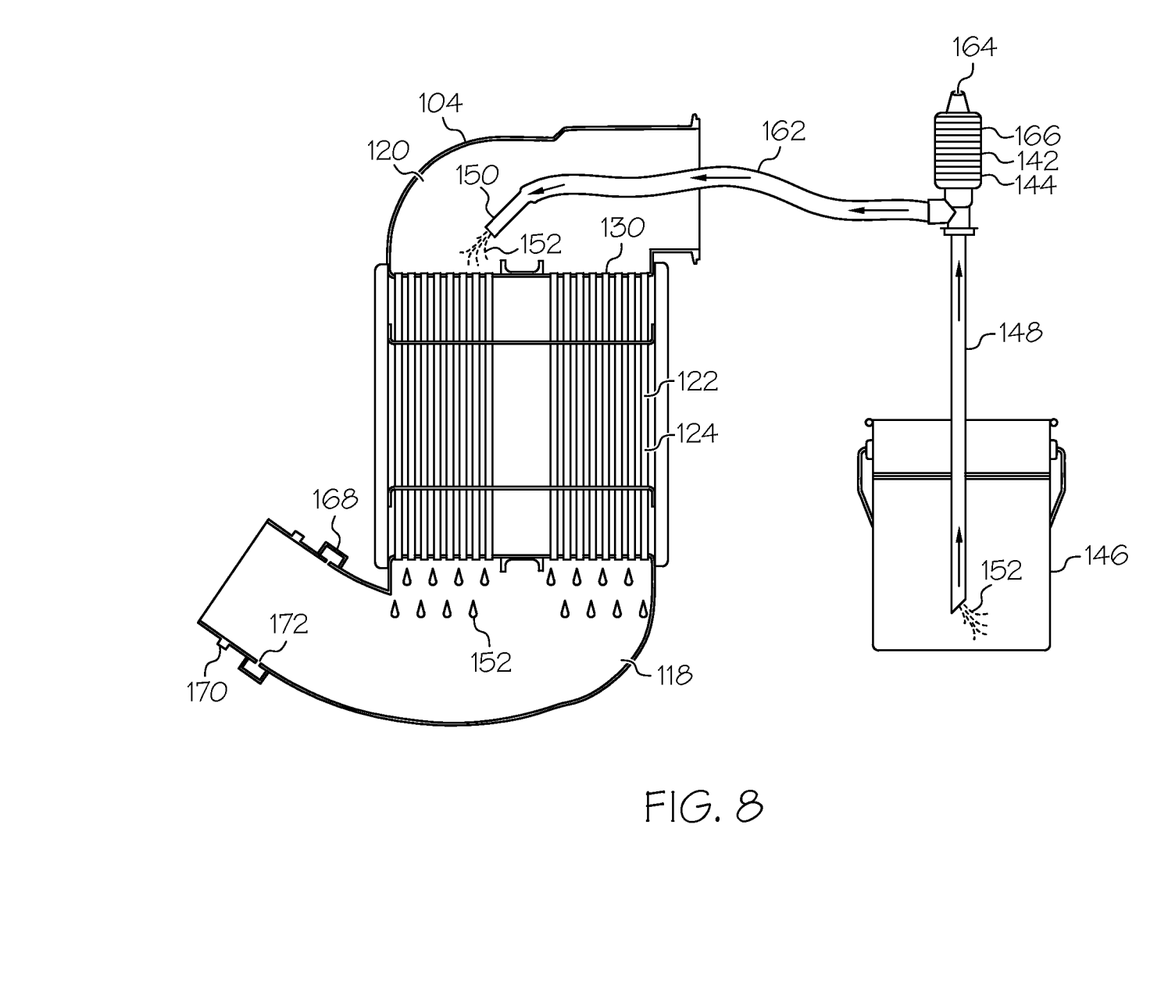
FIG. 8 is a schematic illustrating part of the exemplary method of repairing a heat exchanger of FIG. 7.

The method 200 starts at step 202 and proceeds to step 204. In step 204 the first fluid circuit 104 may be positioned such that one of the inlet manifold 118 and the outlet manifold 120 is above the fluid channels 122, and the other of the inlet manifold 118 and the outlet manifold 122 is below the fluid channels 122. In one embodiment, as depicted in FIG. 8, the outlet manifold 120 may be positioned above the fluid channels 122, and the fluid channels 122 may be positioned above the inlet manifold 118, as that positioning may allow a technician better access to the fluid channels 122. In alternative embodiments where a repair may be being made on a different embodiment of the first fluid circuit 104, the inlet manifold 118 may be positioned above the fluid channels 122. Those skilled in the art will be able to determine how to position the first fluid circuit 104 for optimum access to fluid channels 122. In some embodiments, the fluid channels 122 may not be accessible from either the inlet or outlet manifold 118, 120. In these embodiments, one or both of the inlet and outlet manifold 118, 120 may have to be removed to provide access to the fluid channels 122. The first fluid circuit 104 may be positioned by placement in a tank or other similar container. In other embodiments the first fluid circuit 104 may be positioned through other means that would be known to an ordinary person skilled in the art.

In step 206, liquid epoxy varnish 152 may be pumped into the fluid channels 122. The positioning of the first fluid circuit 104 may be done in step 204 such that gravity assists in flowing the epoxy varnish 152 through fluid channels 122. FIG. 8 illustrates an embodiment of this step. Varnish 152 may be pumped with pump 140 into fluid channels 122. In the embodiment illustrated, the pump 140 may include a hand operated siphon pump 142 including a bulb 166 and vent cap 164. A discharge spout 162 of the siphon pump may be directed through the inlet or outlet manifold 118, 120 and to the fluid channels 122. As the pump 140 is activated, the varnish 152 may be directed into each channel 122. Varnish 152 may be drawn from a container 146 and through a suction tube 148. The varnish 152 may be directed through the discharge spout 162, to a nozzle 150, and into the fluid channels 122. In alternative embodiments pump 140 may include other types of pumps such as those powered by electric motors, and other pumps which would be known by an ordinary person skilled in the art.

The container 146 may include the container the epoxy varnish 152 is supplied in from a manufacturer or a distributor, or in other embodiments container 146 may include any container that would be known by an ordinary person skilled in the art which would safely contain the epoxy varnish 152.

In one embodiment, the epoxy varnish 152 may include a heat cured water reducible epoxy-phenolic varnish which may have been specifically developed for anti-corrosion and heat protection, and for use in the aeronautical sector. The varnish 152 may have excellent anti-corrosion performance, very good resistance to aeronautical fluids, and good heat resistance. In the liquid form, in which it may be used according to this method, the varnish 152 may be 36.6%+/−2% solids by weight, and have a 34%+/−2% volume of solids. The varnish 152 may have a density of 1.04+/−0.05, and a viscosity of 20 s+/−3 CA4 at 20 degrees Celsius. When hardened, the varnish 152 may be rated to withstand a salt fog for 500 hours, resist some fire resistant aviation hydraulic fluids for 24 hours, and resist engine oil for 24 hours. In alternative embodiments, other epoxy varnishes may be used, and may be chosen, at least in part, to match the materials of the first fluid circuit 104, and the requirements of the application, as would be known by an ordinary person skilled in the art. Steps 204 through 216 may be performed in an environment with a temperature in the range of between 15 and 30 degrees Celsius, with a humidity of less than 70%. In other embodiments the required temperature and humidity range may vary depending, at least in part, on the type of varnish 152 used and the specifications of the varnish 152.

In step 208, the varnish 152 fills in cracks 128 and apertures 126 in the walls 136 of the fluid channels 122, and spaces 140 between the fluid channels 122 and other components of the heat exchanger 102 at joints 129, as it flows through the fluid channels 122, through gravitational force.

Surface tension around the edges of apertures 126 and/or cracks 128 may allow the epoxy varnish 152 to fill in the apertures 126 and/or cracks 128 without flowing out of the channel 122.

In step 210, the varnish 152 forms a coating on the inside surface of the walls 136 of the fluid channels 122 as the varnish 152 flows through the fluid channels 122. The viscosity of the varnish 152 may allow the coating to develop along the boundary layer on the inside surface 138 of the walls 136. A technician may watch for the varnish to flow out of the fluid channels 122 on the opposite end from which it was pumped into the fluid channels 122. Varnish 152 may be removed from the inlet or outlet manifold 118, 120 with shop rags and/or solvent during this and other steps. If the varnish 152 is not removed from the inlet manifold 118 or outlet manifold 120, and hardens, it may alter flow characteristics in the first fluid circuit 104 which may have a detrimental effect on performance of the heat exchanger 102.

Figure 9:
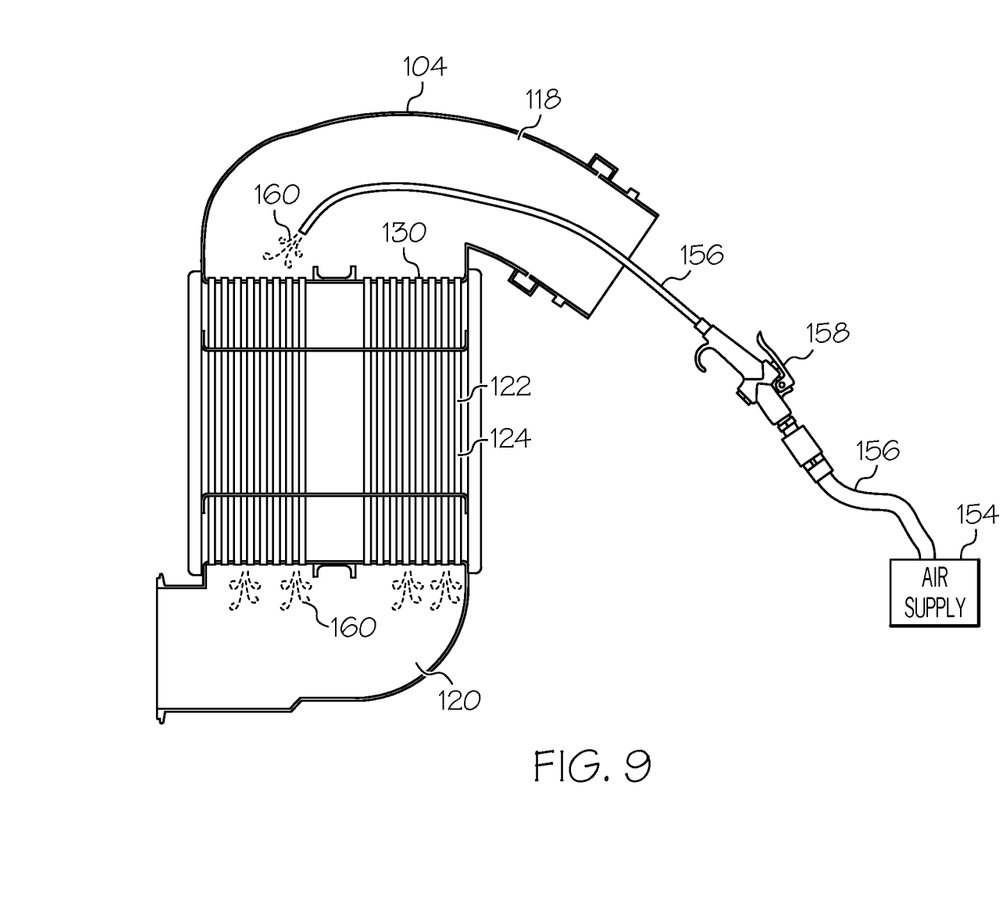
FIG. 9 is a schematic of part of the exemplary method of repairing a heat exchanger of FIG. 7.

In step 212, a technician may blow air 160 from an air supply 154 through the fluid channels 122 to force excess varnish through the fluid channels 122 and into the inlet or outlet manifold 118, 120. As illustrated in FIG. 9, in one embodiment, the air 160 may flow from air supply 154 to air gun 158. Air gun 158 may control the volume of air 160 being directed into conduit 156, into the fluid channels 122, and then from the fluid channels 122 into the inlet or outlet manifold 118, 120.

In the embodiment of FIG. 9, air 160 may be blown into the fluid channels 122 from access within the inlet manifold 118, such that excess varnish 152 may be forced into the outlet manifold 120. In this embodiment, the inlet air manifold 118 includes a water extractor 168 close to an inlet flange. The extractor 168 includes a slot opening 172 in a round duct. Excess varnish 152 may initially be removed with a rag from inside the inlet manifold 118. The air may be blown through the inlet manifold 118 to keep any excess varnish from entering the water extractor 168, and thus preventing the removal of water from the first fluid circuit 104. Once most of the excess varnish 152 is removed, air 160 may be blown through either the inlet or outlet manifold 118, 120 of the first fluid circuit 104 without a risk of blocking the water extractor 168. In one embodiment, air may be blown first from one of the inlet and outlet manifold 118, 120 into the fluid channels 118, 120, and then from the other of the inlet and outlet manifold 118, 120 into the fluid channels 118, 120. Depending on the embodiment, the first fluid circuit 104 may need to be repositioned once or more during this step.

In one embodiment, the air supply 154 may include an air supply used for an entire facility, such as a shop compressed air supply. In one embodiment, the shop air supply pressure may average 95 psig. The air 160 may be blown through an air gun 158 with a maximum pressure of 30 psi. Thus the range of air pressure in which the air 160 may be blown through the fluid channels 122 may be 0-30 psig in this embodiment. The air pressure used to blow air into the channel 122 may be determined based, at least in part on the viscosity of the epoxy varnish 152, and the geometry of the channels 122 in specific, and the first fluid circuit 104 in general. Operation of the air gun 158 may first provide a smaller volume of air 160 blown in into the fluid channels 122, and then increase the volume to the maximum available. How much pressure is applied to the air gun 158 trigger may determine the volume of air 160 supplied. In other embodiments other air pressures may be used. The air pressure used may be determined by an ordinary person skilled in the art depending, at least in part, on the design of fluid channels 122, and the first fluid circuit 104, and the composition of the specific epoxy varnish 152 used. In other embodiments alternative air supplies 154 may be used as would be known by an ordinary person skilled in the art.

In step 214, excess varnish 152 may be removed from the inlet and/or outlet manifold 118, 120, as the excess varnish 152, when dry, may alter the flow characteristics of the first fluid circuit 104, and thus the performance of the heat exchanger 102. The excess varnish 152 may be removed with shop rags and a solvent or in any other way which would be known by an ordinary person skilled in the art.

In step 216, the first fluid circuit 104 may rest for a time period. The time period may be in a predetermined epoxy varnish resting time period range. The predetermined epoxy varnish rest period may be determined by the epoxy varnish 152 manufacturer recommendations for use. In one embodiment, the predetermined epoxy varnish rest period may be between 0-30 minutes. In other embodiments the predetermined epoxy varnish rest period may be determined in any way known to an ordinary person skilled in the art. In some embodiments there may be no predetermined epoxy varnish rest period.

In step 218, the first fluid circuit 104 may be heated to a temperature in a predetermined epoxy varnish temperature range for a time period in a pre-determined epoxy varnish time period range. The predetermined epoxy varnish temperature range and the predetermined epoxy varnish time period range may be determined by the epoxy varnish 152 manufacturer recommendations for use, or by any other method known by an ordinary person skilled in the art. In one embodiment, the predetermined epoxy varnish temperature range may be between 350 and 380 degrees Fahrenheit, and the predetermined epoxy varnish time period range may be between 40 and 65 minutes. In one embodiment, the first fluid circuit 104 may be heated by placing the first fluid circuit 104 in an oven. The first fluid circuit may then be subjected to internal leakage and air pressure drop tests to demonstrate a successful completion to the repair. Once the repair is complete, the first fluid circuit 104 may be reinstalled in an application. The method 200 may proceed to step 220 and end.

It should be understood, of course, that the foregoing relates to exemplary embodiments of the invention and that modifications may be made without departing from the spirit and scope of the invention as set forth in the following claims.

We claim:

1. A fluid circuit for a heat exchanger, comprising:
   a fluid inlet manifold;
   a fluid outlet manifold;
   at least one fluid channel fluidly connected between the fluid inlet manifold and the fluid outlet manifold, the at least one fluid channel including:
      at least one of an aperture and a crack, and
      an interior wall having an inside surface that extends beyond a perimeter of the at least one of the aperture and the crack; and
   a hardened epoxy varnish coating at least a portion of the inside surface that extends beyond the perimeter of the at least one of the aperture and the crack and filling in the at least one of the aperture and the crack;
   wherein the thickness of the hardened epoxy varnish is between 5 microns and 25 microns.

2. The fluid circuit for a heat exchanger of claim 1, wherein the at least one fluid channel includes aluminum.

3. The fluid circuit for a heat exchanger of claim 1, wherein the at least one fluid channel includes one or more cylindrically shaped tubes.

4. The fluid circuit for a heat exchanger of claim 1, wherein the dried epoxy varnish coating includes a heat cured, water reducible, and heat resistant epoxy-phenolic varnish.

\* \* \* \* \*